United States Patent [19]

Weldy et al.

[11] Patent Number: 5,167,075
[45] Date of Patent: Dec. 1, 1992

[54] PIPE BENDING LEVEL

[75] Inventors: Philip D. Weldy, Mishawaka; Robert Northern, South Bend, both of Ind.

[73] Assignee: All-Pro Level, Inc., Mishawaka, Ind.

[21] Appl. No.: 706,396

[22] Filed: May 28, 1991

Related U.S. Application Data

[63] Continuation-in-part of Ser. No. 554,844, Jul. 19, 1990.

[51] Int. Cl.⁵ .................................................. G01C 9/00
[52] U.S. Cl. ........................................ 33/343; 33/371
[58] Field of Search ................. 33/370, 371, 381, 382, 33/383, 334, 341, 347, 451

[56] References Cited

U.S. PATENT DOCUMENTS

| | | | |
|---|---|---|---|
| 2,559,961 | 7/1951 | Howell | 33/451 X |
| 2,652,628 | 9/1953 | Jensen et al. | 33/343 |
| 4,394,799 | 7/1983 | Moree et al. | 33/371 X |
| 4,589,213 | 5/1986 | Woodward | 33/371 |
| 4,934,706 | 6/1990 | Marshall | 33/334 X |

FOREIGN PATENT DOCUMENTS 46556  11/1932  Fed. Rep. of Germany ........ 33/343

Primary Examiner—Harry N. Haroian
Attorney, Agent, or Firm—Thomas J. Dodd

[57] ABSTRACT

A level/protractor tool which includes two or more sections pivotally joined to facilitate angular displacement. One or more sections house level-indicating spirit vials. Angular displacement indicia marks are imprinted on each section at its juncture with an adjoining section to visually indicate the degree of angular displacement between adjacent sections.

6 Claims, 5 Drawing Sheets

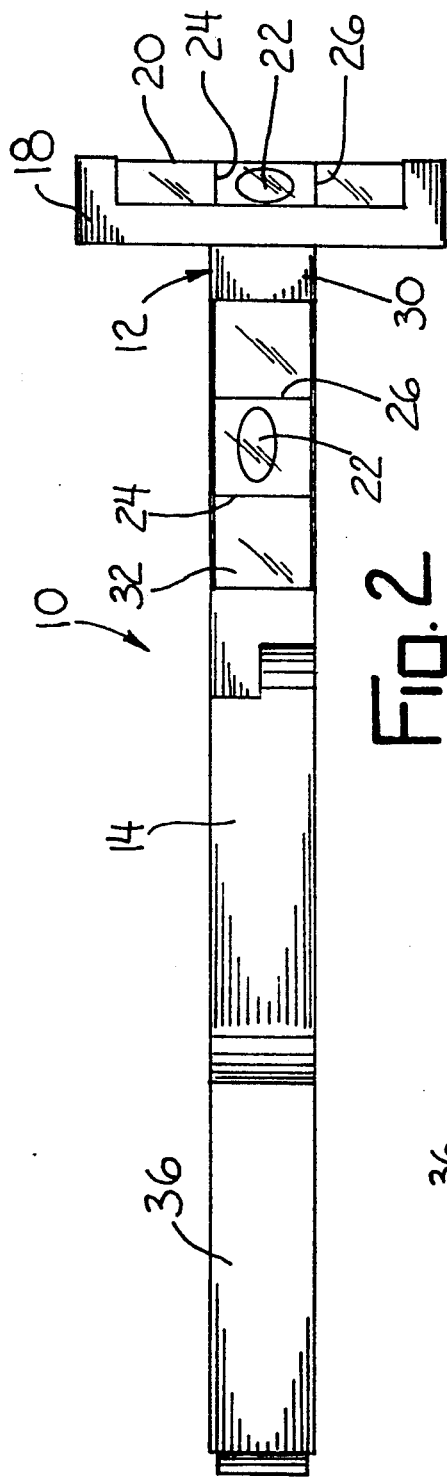
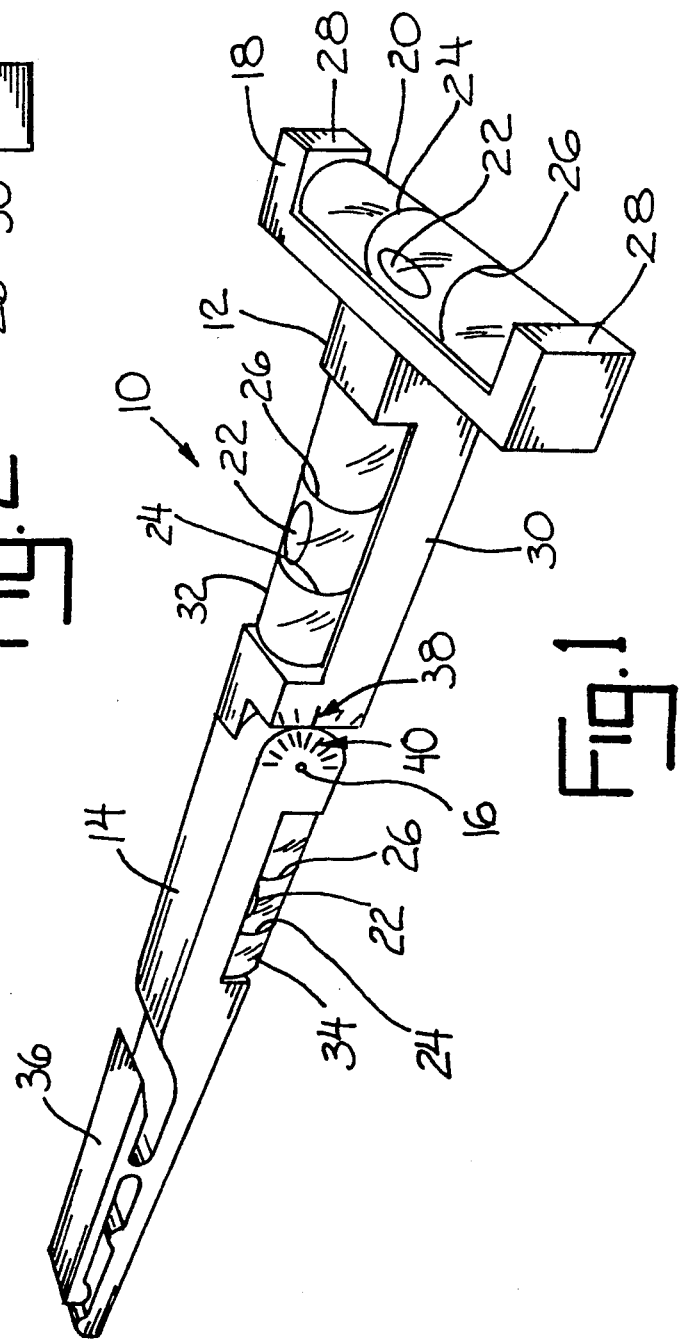

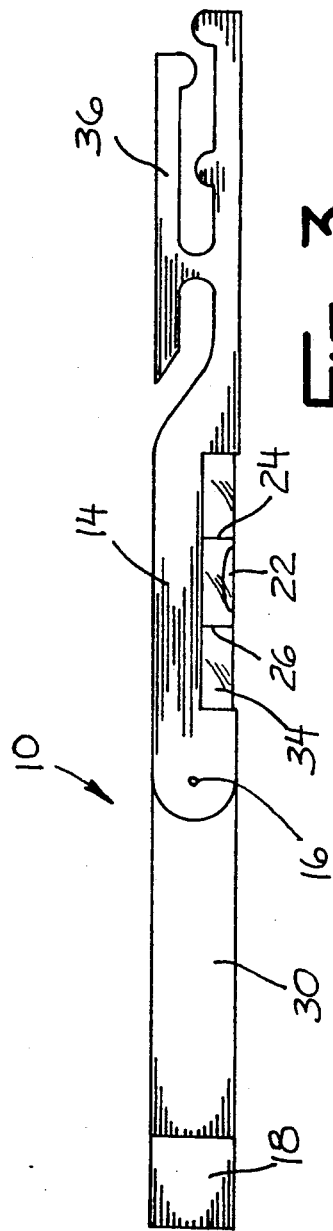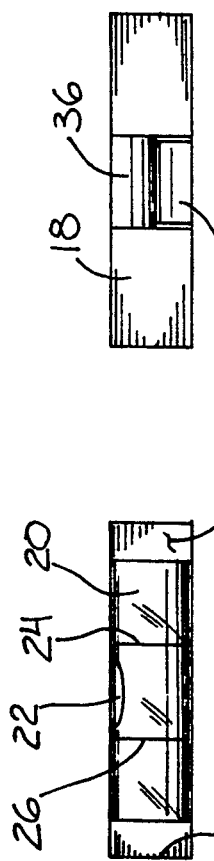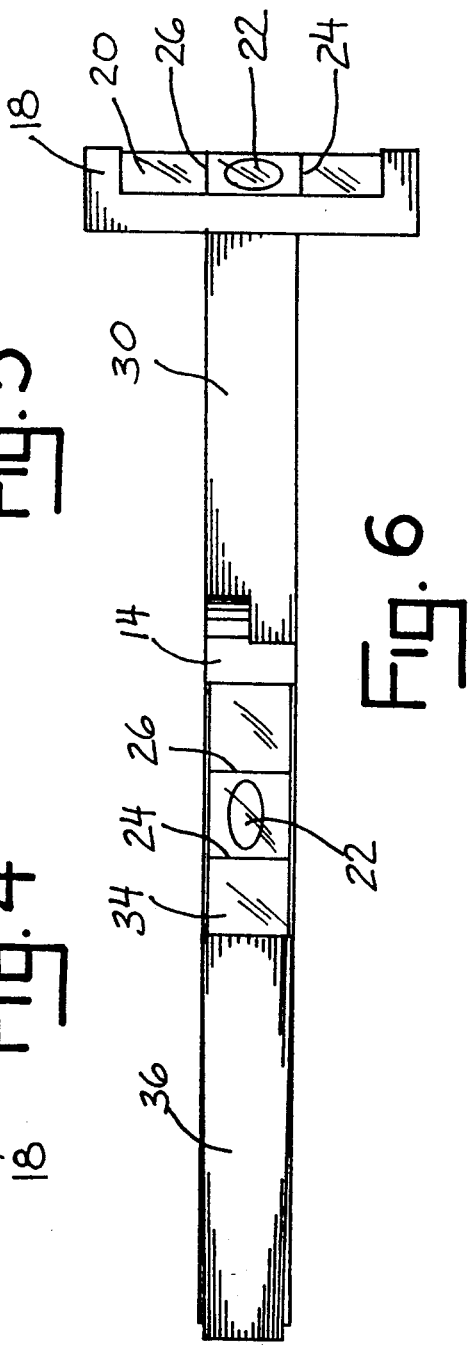

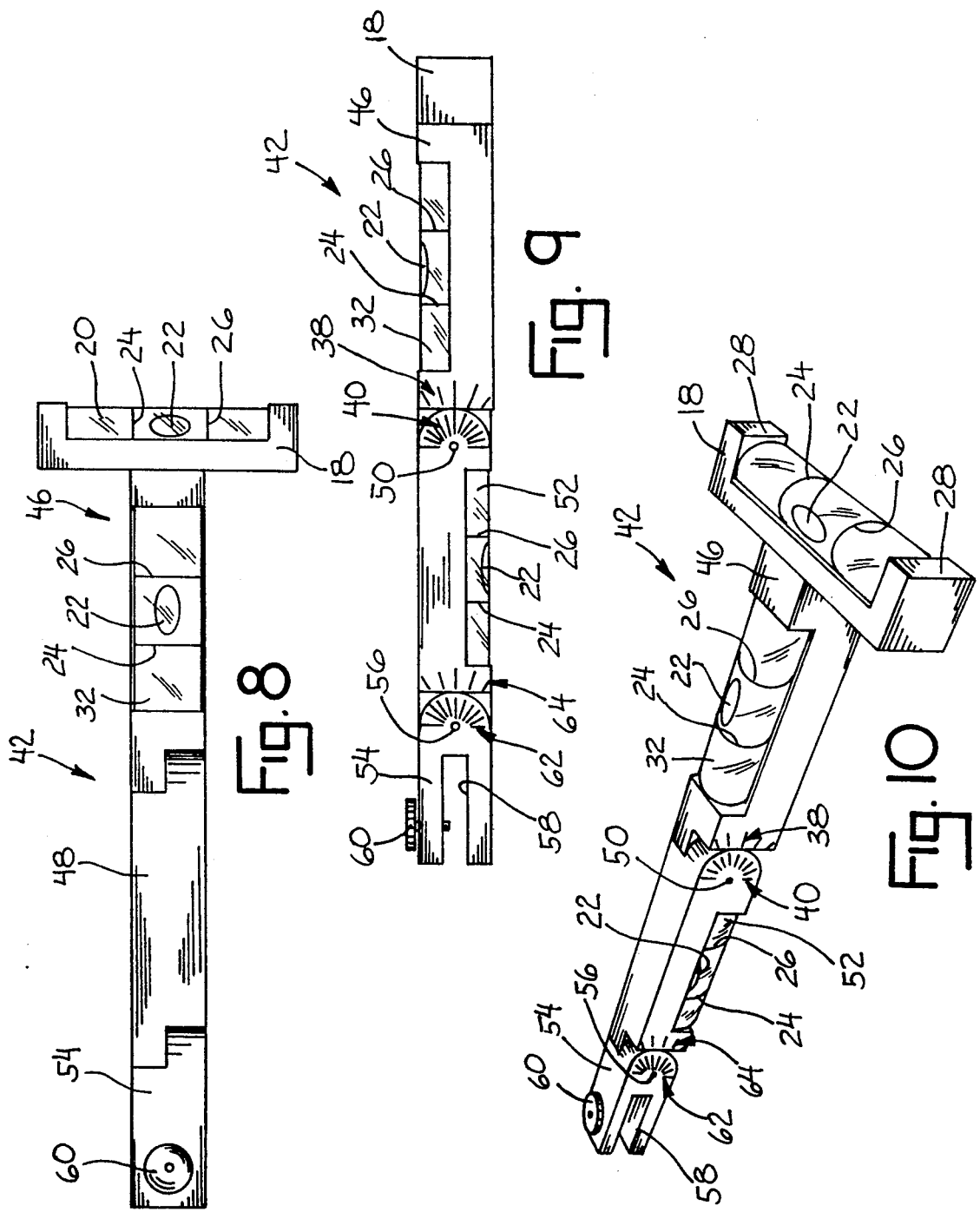

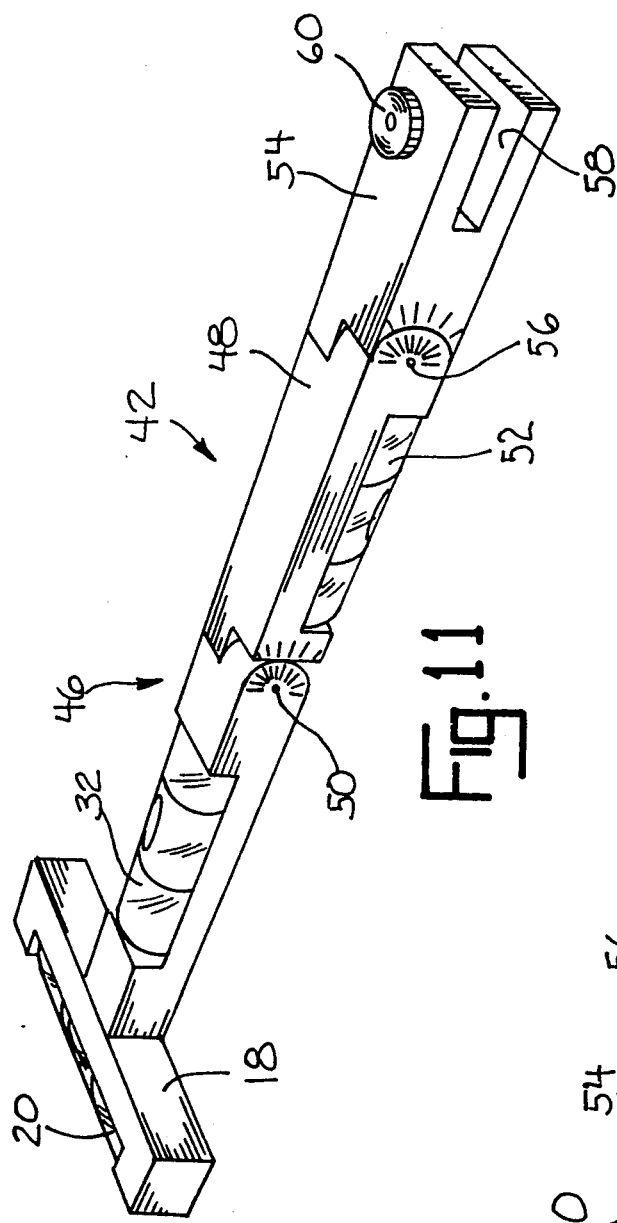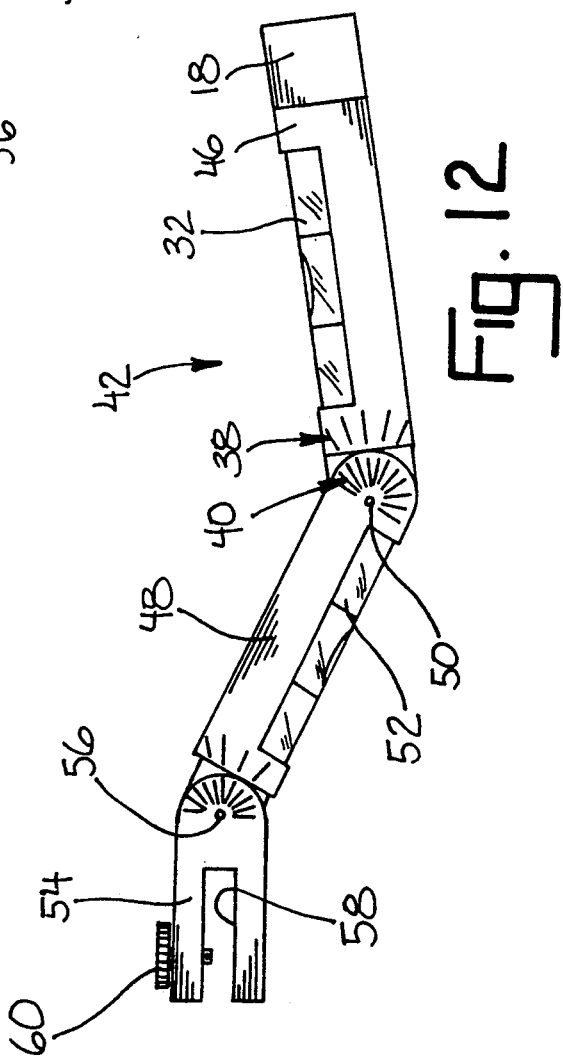

PIPE BENDING LEVEL

CROSS-REFERENCE TO RELATED APPLICATIONS

This application is a continuation in part of application Ser. No. 554,844, filed Jul. 19, 1990.

FIELD OF THE INVENTION

This invention relates to leveling tools and has special application to pipe bending levels.

BACKGROUND OF THE INVENTION

Levels are used extensively in the construction industry to determine level and plumb surfaces. The most common type of level is referred to as a spirit level which normally includes a frame which houses a closed end tube filled with alcohol, ether, or a mixture thereof. A small bubble of air is entrained in the tube and by basic physical laws seeks out the highest point in the tube. By marking the tube with parallel lines at equidistant points from the tube center, a user can visually determine whether the surface the level is resting on is substantially level. Other tools have been used and made in combination with a standard level in efforts to make the tool more versatile.

SUMMARY OF THE INVENTION

The pipe bending level of this invention is a versatile tool which combines the features of multiple levels and protractors to assist mainly workers who must bend conduit or piping. The tool has multiple sections which can be pivoted to accomplish angular displacement in a multiplicity of positions between zero degrees and ninety degrees.

One of the pivoting sections serves to angularly adjust one or more of the spirit vials during conduit bending operations when a level plain cannot be reached. The outermost pivoting section normally houses two spaced spirit vials to determine level plain, and another outermost section, which is option, may serve as a fastener of the tool onto a conduit, and may also perform the angular adjustment feature referred to above.

The tool also includes protractors which measure the angular displacement between the various sections of the tool.

Accordingly, it is an object of this invention to provide for a tool which combines the functionality of an adjustable level and a protractor.

Another object is to provide a level/protractor tool which is useful in conduit bending operations.

Another object is to provide for a level/protractor tool which is easy to use, durable, compact, and is economical to produce.

Other objects will become apparent upon a reading of the following description.

Brief Description of the Drawings

FIG. 1 is a perspective view of a first embodiment of a level/protractor tool of this invention.
FIG. 2 is a top plan view of the tool of FIG. 1.
FIG. 3 is a side elevation view of the tool.
FIG. 4 is a front end elevation view of the tool.
FIG. 5 is a rear end elevation view of the tool.
FIG. 6 is a bottom plan view of the tool.
FIG. 8 is a perspective view of a modified level/protractor tool.
FIG. 9 is a top plan view of the tool of FIG. 8.
FIG. 10 is a side elevation view of the tool of FIG. 8.
FIG. 11 is a rear perspective view of the tool of FIG. 8.
FIG. 12 is a side elevation view of the tool showing the tool in a bent orientation.

DESCRIPTION OF THE PREFERRED EMBODIMENT

Figure 7:
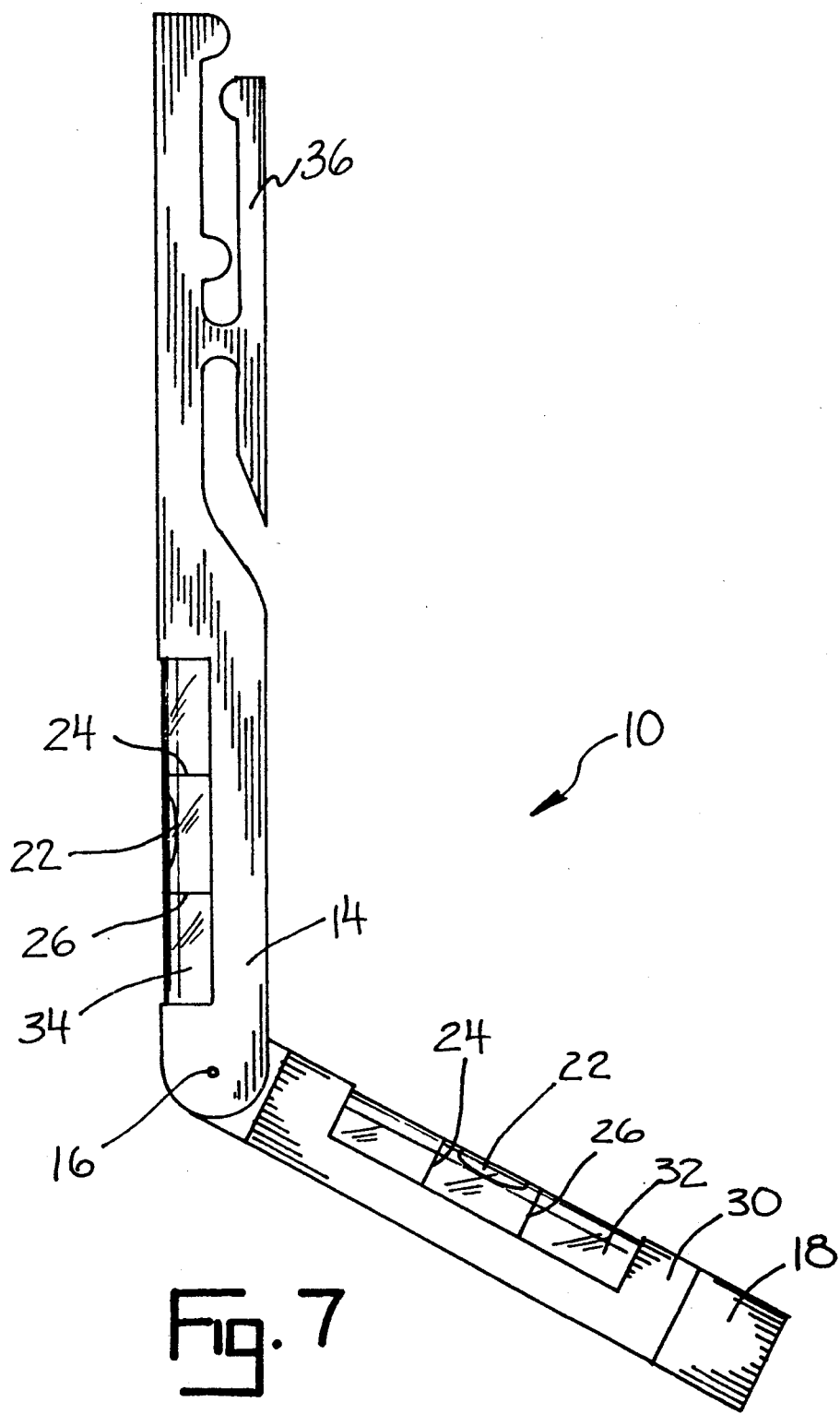
FIG. 7 is a side elevation view of the tool shown in a bent orientation.

The preferred embodiments herein described are not intended to be exhaustive or to limit the invention to the precise forms disclosed. They are chosen and described to explain the principles of the invention and their application and practical use to allow others skilled in the art to follow their teachings.

Referring first to FIGS. 1–6, reference numeral 10 generally designates a first embodiment of the level/protractor tool of this invention. Tool 10 includes a T-shaped front section 12 and a clip section 14 pivotally connected by pin 16.

Front section 12 includes a cross member 18 which houses spirit vial 20. Vial 20 is a conventional spirit vial found in most level tools and is filled with alcohol, ether or a mixture thereof. Air bubble 22 is entrained in vial 20 and will be positioned between centering lines 24, 26 when the outer faces 28 of member 18 are positioned level with a reference surface (not shown).

Front section 12 also includes an integral frame part 30 which extends from cross member 18 and houses spirit vial 32. Vial 32 is constructed the same as vial 20 and serves as a visual indicator of the level status of a reference surface (not shown).

Clip section 14 houses spirit vial 34 which is of the same construction as vials 20, 32. For simplicity and clarity, the corresponding parts of all vials 20, 32, 34 have been assigned the same reference characters. Clip section 14 also includes resilient clip 36 which is used to secure the tool 10 to a conduit (not shown) during conduit bending operations.

Imprinted on sections 12, 14 at or near their adjacent portions are angle indicating indicia marks 38, 40 respectively. Indicia marks 38, 40 indicate the angular displacement between sections 12, 14 which is extremely useful to persons who bend flexible conduit or pipe. The degree of displacement shown is between 0° and 90° in 22½° increments but any number of indicia are possible within the scope of this invention.

FIGS. 7–12 illustrate a second embodiment 42 of a level/protractor tool constructed according to the principles of this invention. Tool 42 includes front section 46 which is of the same general construction as front section 12 and has the same numbers assigned to its individual components for clarity. Tool 42 also includes an intermediate section 48 which is pivotally connected to section 46 by pin 50 and houses spirit vial 52 which is identical in construction and function to vial 34. A magnetic strip (not shown) may be attached to section 46 and serves as a connection device to metal objects (not shown).

Connector section 54 is pivotally attached to section 48 as by pin 56. Connector section 54 defines slot 58 which may be fitted about conduit (not shown) and a fastener 60 for clamping the tool 42 to the conduit. Angular displacement between sections 48, 54 is shown by indicia 62, 64 in a similar fashion to indicia marks 38, 40 visually indicating angular displacement between sections 46, 48.

It is understood that the above description does not limit the invention to the given details, but may be modified within the scope of the following claims.

We claim:

1. A level/protractor tool comprising a first section, said first section housing a first spirit vial means for providing a visual indication of a level plane relative to a reference surface, and a second section pivotally connected to said first section for relative angular displacement therebetween, said second section housing a second spirit vial means for providing visual indication of a level plane relative to a reference surface, indicia marks imprinted on said first and second sections for providing a visual indication of angular displacement between said first and second sections, said first section including a frame portion and an integral cross member positioned substantially perpendicular to said frame portion, said cross member housing a third spirit vial means positioned at substantially a right angle relative to said first and second spirit vial means, said third spirit vial means for providing a visual indication of a level plane relative to a reference surface, said frame portion pivotally connected to said second section by a pivot pin.

2. The level/protractor tool of claim 1 wherein said second section includes an integral clip means for fastening said tool to a conduit.

3. The level/protractor of claim 1 and a third section pivotally connected to said second section, said third section including means for fastening said tool to a conduit.

4. The level/protractor tool of claim 3 and a magnetic connector strip connected to said tool.

5. The level/protractor tool of claim 1 and a third section pivotally connected to said second section, said third section including means for fastening said tool to a conduit.

6. The level/protractor tool of claim 5 and second indicia marks imprinted on said second and third sections at a juncture thereof for visually indicating angular displacement between said second and third sections.

* * * * *